US012522350B2

(12) United States Patent
Barsali

(10) Patent No.: US 12,522,350 B2
(45) Date of Patent: Jan. 13, 2026

(54) AIRCRAFT LANDING GEAR ASSEMBLY

(71) Applicant: AIRBUS OPERATIONS LIMITED, Bristol (GB)

(72) Inventor: Guilherme Barsali, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/323,099

(22) Filed: May 24, 2023

(65) Prior Publication Data

US 2023/0382518 A1    Nov. 30, 2023

(30) Foreign Application Priority Data

May 25, 2022    (GB) ..................................... 2207706

(51) Int. Cl.
*B64C 25/12*    (2006.01)
*B64C 25/26*    (2006.01)
*B64F 5/10*    (2017.01)

(52) U.S. Cl.
CPC .............. *B64C 25/12* (2013.01); *B64C 25/26* (2013.01); *B64F 5/10* (2017.01)

(58) Field of Classification Search
CPC ......... B64C 25/12; B64C 25/26; B64C 25/22; B64C 25/20; B64F 5/10
See application file for complete search history.

(56) References Cited

U.S. PATENT DOCUMENTS

| 2,431,302 | A | * | 11/1947 | Bachman | ............... B64C 25/505 244/104 FP |
| 2,484,919 | A |   | 10/1949 | Westcott, Jr. | |
| 2,497,489 | A | * | 2/1950  | Coursen | .................. B64C 25/22 244/102 R |
| 2,529,401 | A | * | 11/1950 | Lawson | .................. B64C 25/14 244/102 SL |
| 4,568,045 | A | * | 2/1986  | Mayer | ..................... B64C 25/26 244/102 R |

(Continued)

FOREIGN PATENT DOCUMENTS

CN    113443128 A    9/2021
EP    3135581 A1    3/2017

(Continued)

OTHER PUBLICATIONS

Boom Supersonic, "Boom prepares to test XB-1's landing gear to the extreme", Jun. 23, 2020, https://blog.boomsupersonic.com/boom-prepares-to-test-xb-1s-landing-gear-to-the-extreme-95425708471b (Year: 2020).*

(Continued)

*Primary Examiner* — William L Gmoser
(74) *Attorney, Agent, or Firm* — Nixon & Vanderhye P. C

(57) ABSTRACT

A retractable landing gear assembly for an aircraft is disclosed having a main strut arranged to pivot between a retracted position and an extended position, and a sidestay having an unfolded position and a folded position. A telescopic actuator is coupled between the main strut and the sidestay, so that when the actuator has a first length the sidestay locks the main strut in the extended position, and when the actuator has a second length the sidestay is in the folded position and the main strut is in the retracted position.

12 Claims, 5 Drawing Sheets

(56) References Cited

U.S. PATENT DOCUMENTS

| | | | | |
|---|---|---|---|---|
| 4,720,063 | A | * | 1/1988 | James ............... B64C 25/14 244/102 R |
| 6,811,116 | B1 | * | 11/2004 | Briancourt ......... B64C 25/12 244/102 R |
| 8,602,352 | B2 | * | 12/2013 | Keller ............... B64C 25/26 244/102 R |
| 2013/0056584 | A1 | | 3/2013 | Dierenfeldt et al. |
| 2013/0181091 | A1 | * | 7/2013 | Evans ............... B64C 25/26 244/102 A |
| 2020/0031457 | A1 | * | 1/2020 | Alley ............... B64C 25/34 |
| 2020/0094949 | A1 | * | 3/2020 | Bernadet ........... B64C 25/04 |
| 2020/0094950 | A1 | * | 3/2020 | Bennett ............ B64C 25/20 |
| 2021/0276699 | A1 | | 9/2021 | Rouiller et al. |
| 2023/0331375 | A1 | * | 10/2023 | Attivi .............. B64C 25/24 |
| 2024/0017821 | A1 | * | 1/2024 | Castellan ........... B64C 25/26 |

FOREIGN PATENT DOCUMENTS

| | | | | |
|---|---|---|---|---|
| EP | 3862264 | A1 | | 8/2021 |
| FR | 1353629 | A | * | 2/1964 ............ B64C 25/12 |
| GB | 463 807 | A | | 4/1937 |
| GB | 747459 | A | | 4/1956 |
| GB | 806 024 | A | | 12/1958 |
| GB | 1010920 | A | | 11/1965 |
| KR | 2004004199 | A | | 5/2004 |
| WO | 2013133839 | A1 | | 9/2013 |

OTHER PUBLICATIONS

FR1353629 Translation (Year: 1964).*
Partial European Search Report for EP Application No. 23175076.1, 12 pages, dated Sep. 25, 2023.
A320 Family ALS Part 1 Revision 05, Issue 2, <https://images.app.goo.gl/zpX5PcZF78BL14Z26>, 1 page.
Air & Cosmos—Mar. 19, 1966: L'atterrisseur principal de Concorde-CAP Avenir Concorde, <https://images.app.goo.gl/FXdJPrtL3vUWi5Zm6>, 1 page.
Combined Search and Examination Report for Application No. GB2207706.9 dated Nov. 22, 2022, 9 pages.
Search Report for Application No. GB2207706.9 dated May 10, 2023, 7 pages.
EP Search Report for Application No. 23175076.1, nineteen pages, dated Jan. 30, 2024.

* cited by examiner

AIRCRAFT LANDING GEAR ASSEMBLY

CROSS RELATED APPLICATION

This application claims priority to United Kingdom Patent Application GB 2207706.9 filed May 25, 2022, the entire contents of which is hereby incorporated by reference.

BACKGROUND OF THE INVENTION

The present invention concerns aircraft landing gear assemblies.

More particularly, but not exclusively, this invention concerns retractable aircraft landing gear assemblies and methods of attaching the same to an aircraft.

Aircraft landing gear assemblies are among the most complex components of an aircraft, as they combine several different functions including suspension/shock absorption, braking, steering, and ground clearance. Furthermore due to their large drag profiles when airborne, landing gear assemblies of large commercial aircraft are retractable. Suitable actuation arrangements are required to enable smooth and efficient transition of the landing gear assemblies between fully retracted and fully extended positions, and locking arrangements must be provided to ensure that they are held in these positions unless in transition.

Due to the above complexity, the various attachment points and the kinematics of the various parts of the landing gear assembly as it moves between retracted and extended positions, the installation and rigging of a landing gear assembly must be done carefully to accommodate the tight clearances and precise motion paths required. This can often lead to inefficiencies and technical difficulties during assembly of a new aircraft, or during a maintenance event requiring removal or replacement of a landing gear assembly.

Furthermore given the complexity described above, current retractable landing gear assembly designs are relatively expensive and heavy.

The present invention seeks to mitigate one or more of the above-mentioned problems. Alternatively or additionally, the present invention seeks to provide an improved landing gear assembly.

SUMMARY OF THE INVENTION

The present invention provides, according to a first aspect, a retractable landing gear assembly for an aircraft which includes a main strut arranged to be coupled to a first attachment point of an aircraft. The main strut is arranged to pivot about the first attachment point between a retracted position and an extended position. A sidestay of the assembly has one end coupled to the main strut and another end arranged to be coupled to a second attachment point of the aircraft. In embodiments, it may be that there are only two principal attachment points to the aircraft. Thus, it may be that there is no third attachment point. This may assist with the efficient installation of the retractable landing gear assembly on the aircraft, because there are only two principal attachment points to the aircraft and because the connection and set-up of the actuator on the retractable landing gear assembly may be carried out in advance of the connecting of the retractable landing gear assembly to the aircraft. The sidestay has an unfolded position and a folded position. An actuator of the retractable landing gear assembly is coupled between the main strut and the sidestay. The actuator is arranged to define a first actuation length which corresponds to the sidestay being in the unfolded position and the main strut being locked in the extended position. The actuator is arranged to define a second actuation length corresponding to the sidestay being in the folded position and the main strut being in the retracted position. Thus, when the actuator has the first actuation length it may cause the sidestay to be in the unfolded position and the main strut to be locked in the extended position. When the actuator has the second actuation length it may cause the sidestay to be in the folded position and the main strut to be in the retracted position.

In embodiments, the forces, if any, between the actuator and the airframe of the aircraft excluding the retractable landing gear assembly, during extension or retraction of the main strut of the retractable landing gear assembly, all pass via the retractable landing gear assembly. Thus, it may be that no forces pass directly between the actuator and the airframe of the aircraft excluding the retractable landing gear assembly during use.

It will be appreciated that embodiments of the first aspect of the invention may be configured such that driven movement of the actuator (both attachments points of which being on the retractable landing gear assembly not at other locations on the aircraft) controls and causes both the movement of the sidestay between its unfolded and folded positions and the movement of the main strut between its retracted position and extended position. Gravity may of course also assist with movement for at least some of such motion in one direction or the other. Since fewer components are required in such embodiments and only two principal attachment points to the aircraft are needed, installation of the retractable landing gear assembly according to an embodiment of the first aspect of the invention is significantly more straightforward than with current designs. In addition, such embodiments may need only one hydraulic actuator for the purposes of retraction and locking of the landing gear assembly.

The retractable landing gear assembly of embodiments of the invention may be lighter and cheaper to manufacture, which also provides increased aircraft payload and therefore more efficiency. Also the retractable landing gear assembly of embodiments of the invention may have fewer joints and therefore less friction which, combined with an optimised kinematics geometry, preferably yielding a shorter retraction time, which in turn improves aircraft performance, especially during climb-out or a missed approach.

Preferably the actuator is arranged to lock the sidestay in the unfolded position. Embodiments with the above arrangement do not therefore require an additional lockstay or associated lockstay actuator, further assisting with the above-described advantages. The first actuation length of the actuator is preferably longer than the second actuation length thereof.

The actuator may be in the form of a locking actuator, that is configured to lock in position when locking the sidestay in its unfolded position. The actuator may be in the form of a self-locking actuator. The actuator may have a self-locking function, for example provided by a valve arrangement and/or a locking device integrated with the actuator. In the case where the actuator is telescopic actuator and comprises a strut or piston rod that is arranged to move within a cylinder, the cylinder may include a device that enables the actuator to be locked in a given position. There may be a device which prevents movement of one part of the actuator relative to another part of the actuator (for example as an interference fit or by causing parts to abut against each other, possibly in dependence on hydraulic pressure within a part of the actuator). There may be a device, for example provided by a valve arrangement, which prevents movement of one part of the actuator relative to another part of the actuator by preventing hydraulic fluid flow within a part of the actuator.

Preferably the actuator is arranged to maintain the first actuation length unless differently actuated.

According to a second aspect of the invention a retractable landing gear assembly for an aircraft is provided which facilitates different embodiments which do not require an additional lockstay or associated lockstay actuator. The retractable landing gear assembly includes a sidestay having an unfolded position and a folded position, and an actuator arranged to provide an actuation force to the sidestay for retraction of the retractable landing gear assembly. The actuator is further arranged to lock the sidestay in the unfolded position. It will be appreciated that embodiments of this second aspect of the invention may require fewer components and again facilitate lighter and cheaper landing gear assemblies with the associated advantages that such features can provide.

The actuator is preferably coupled between the sidestay and a main strut of the retractable landing gear assembly, and is preferably a hydraulic actuator mounted in a telescopic strut.

Preferably the sidestay includes two arms coupled via an articulated joint, and the actuator is coupled to the articulated joint.

Preferably the sidestay has an over-centre locking arrangement, such that when in the unfolded position compression forces acting between the ends of the sidestay hold it in the unfolded position.

According to a third aspect of the invention, there is provided an aircraft having at least one retractable landing gear assembly as described above. The aircraft is preferably a passenger aircraft. The passenger aircraft preferably comprises a passenger cabin comprising a plurality of rows and columns of seat units for accommodating a multiplicity of passengers. Embodiments of the present invention may have particular application in relation to the manufacture of relatively large aircraft. The aircraft may have a capacity of at least 20, more preferably at least 50 passengers, and more preferably more than 50 passengers. The aircraft may be a commercial aircraft, for example a commercial passenger aircraft, for example a single aisle or twin aisle aircraft. For the purposes of the present specification the term commercial passenger aircraft also covers aircraft of an equivalent size configured for cargo and/or used on a non-commercial basis. The aircraft may have a maximum take-off weight (MTOW) of at least 20 tonnes, optionally at least 40 tonnes, and possibly 50 tonnes or more. The aircraft may have an operating empty weight of at least 20 tonnes, optionally at least 30 tonnes, and possibly about 40 tonnes or more.

According to a fourth aspect of the invention, there is provided a method of manufacturing a retractable landing gear assembly for attachment to an aircraft. The method includes coupling an actuator between first and second elements of the retractable landing gear assembly, the actuator being arranged to retract (and optionally also extend) the retractable landing gear assembly when in use on an aircraft. The coupling of the actuator between the first and second elements of the retractable landing gear assembly may take place on a jig, arranged to mirror the attachment points of the aircraft to which the retractable landing gear assembly is to be attached. This allows required positions, distances and other parameters of the retractable landing gear assembly to be measured and adjusted. These parameters may for example include internal distances between elements of the retractable landing gear assembly, for example when in certain predefined positions (e.g. when fully extended and/or when fully retracted). With the actuator so coupled, the retractable landing gear assembly may be retracted and extended several times in order to confirm and if necessary make adjustments to the kinematics (motion paths) of the retractable landing gear assembly as it transitions between a retracted configuration and an extended (deployed) configuration.

In this way the kinematics and motion paths of the elements of the retractable landing gear assembly between the retracted configuration and the extended configuration may be verified and adjusted such that these steps are avoided or minimised when the retractable landing gear assembly is attached to the aircraft. Embodiments of the fourth aspect of the invention may thus allow for more efficient assembly of an aircraft, by means of verifying more aspects of the operation of the landing gear pre-assembly rather than post-assembly. Once attached to the aircraft, the retractable landing gear assembly may require further components to be added to it, or adjustments made before it is considered fully operational.

According to a fifth aspect of the invention, a method of attaching a retractable landing gear assembly to an aircraft is provided. The method includes attaching a first element of the retractable landing gear assembly to a first attachment point of the aircraft and attaching a second element of the retractable landing gear assembly to a second attachment point of the aircraft. The retractable landing gear assembly includes an actuator coupled between the first and second elements respectively, such that the actuator is arranged to retract and extend the retractable landing gear assembly when in use on an aircraft.

Preferably the method includes, prior to the step of attaching the first element of the retractable landing gear assembly to a first attachment point of the aircraft, retracting and extending the retractable aircraft landing gear assembly on a jig and performing adjustments to parameters and connections of the retractable landing gear assembly. The first and second attachment points of the jig are substantially similar to the respective first and second attachment points of the aircraft. In this way the retractable aircraft landing gear assembly may be rigged and adjusted before the final assembly line or maintenance facility where it will be fitted to the aircraft, and does not require further substantive adjustment during the step of attaching the retractable aircraft landing gear assembly to the aircraft.

The first and second elements of the retractable landing gear assembly preferably comprise a main strut and a sidestay respectively. The sidestay preferably includes two arms coupled via an articulated joint. The actuator is preferably coupled to the articulated joint.

Preferably the actuator is further arranged to lock the sidestay in the unfolded position. The actuator is preferably a hydraulic actuator mounted in a telescopic strut. The actuator may be coupled to the main strut via an arm. The actuator may be coupled to the main strut via a pivot joint, which may be at the upper end of the landing gear main strut. The other end of the actuator may be coupled to the sidestay via a pivot joint. The actuator may be coupled to the main strut via a pivot joint that is spaced apart from the axis of pivoting of the main strut arranged about the first attachment point, for example to provide an eccentric motion arrangement. It may be that that pivot joint of the actuator is spaced apart from the first attachment point in such a way that the first attachment point is between that pivot joint of the actuator and the second attachment point of the aircraft, when viewed in a direction parallel to the axis of pivoting of the main strut. In embodiments, the actuator may be coupled to the main strut at an arm eccentric to a pivot axis of the first attachment point. The arm may be rigidly fixed relative to the main strut.

This results in embodiments enabling a much faster and simpler installation of the landing gear assembly at a 'final assembly line' or during a maintenance event requiring replacement of a landing gear assembly.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
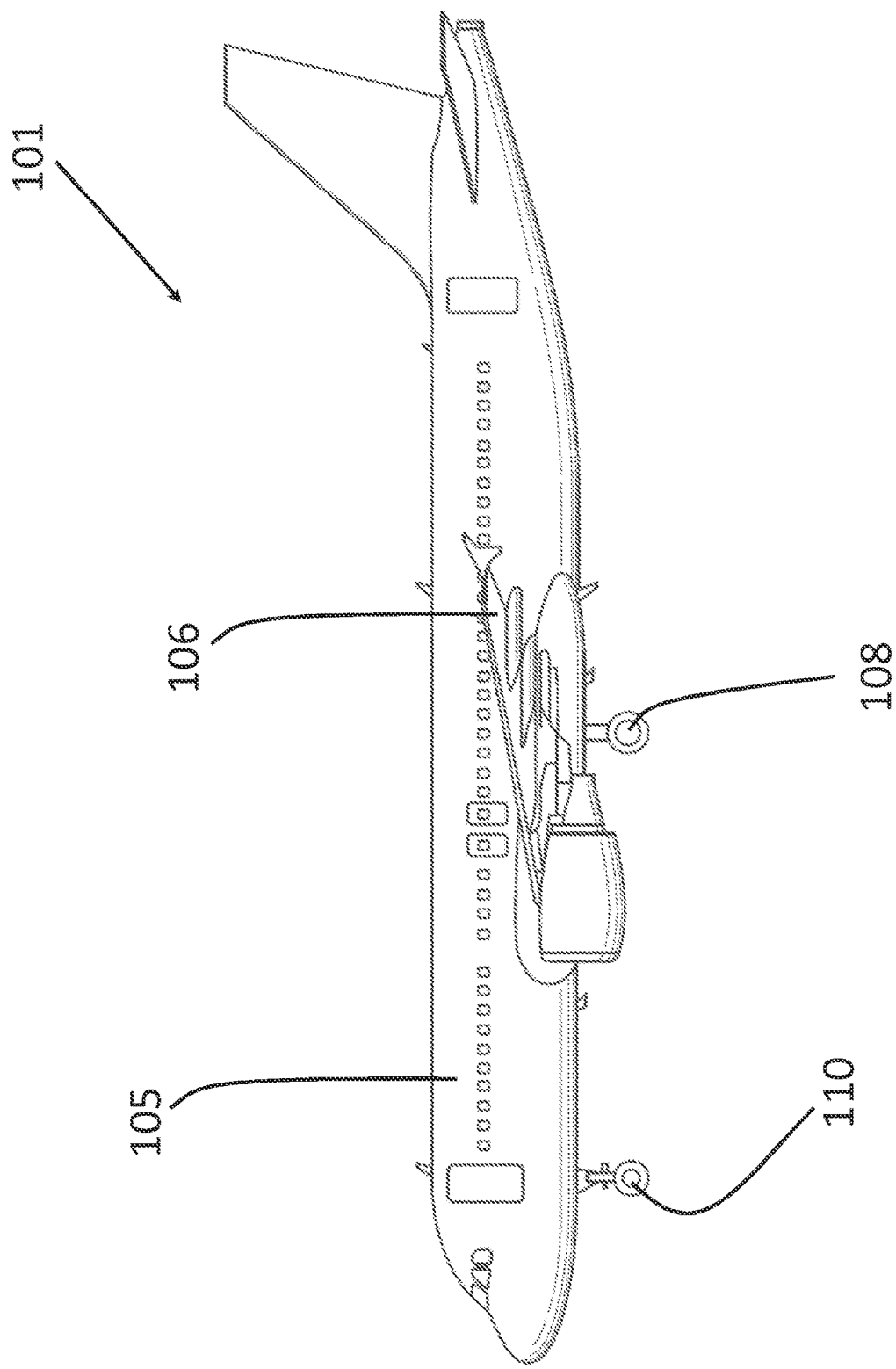
FIG. 1 shows an aircraft having landing gear assemblies according to an embodiment of the invention.

FIG. 1 shows an aircraft 101 comprising a pair of wings 106 and a fuselage 105. The aircraft is supported on the ground by sets of landing gear assemblies comprising main landing gear assemblies (MLG) 108 and a nose landing gear assembly (NLG) 110.

Figure 2:
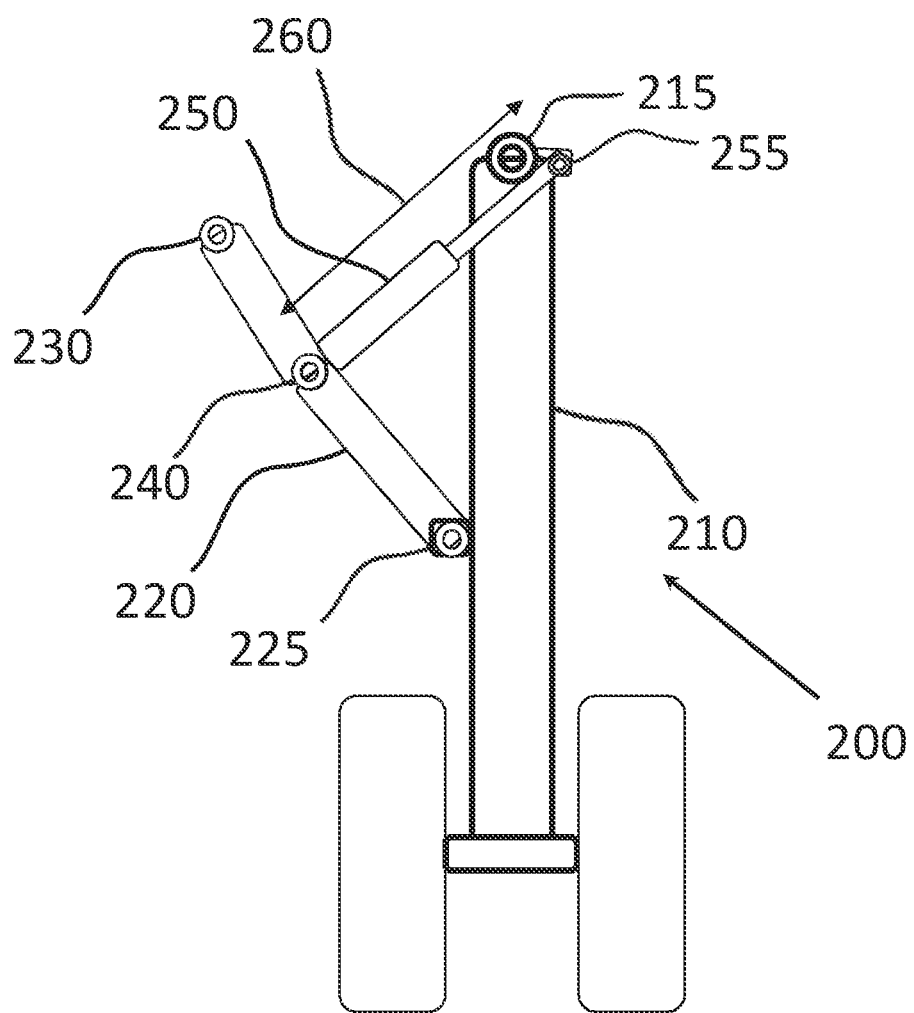
FIG. 2 shows an aircraft landing gear assembly according to a first embodiment of the invention in a first position.

Referring now also to FIG. 2 there is shown a simplified illustrative drawing of a landing gear assembly 200 attached to the aircraft 101 of FIG. 1. The landing gear assembly 200 may be attached to part of the fuselage 105, or a portion of one of the pair of wings 106 of the aircraft 101. Apart from attachment points of the aircraft 101 to be further described below, other components of the aircraft 101, such as a landing gear wheel-well, landing gear bay doors and associated systems are omitted for the sake of clarity. The landing gear assembly 200 is shown in FIG. 2 in a down-locked (i.e. extended) condition.

A main strut 210 of the aircraft landing gear assembly 200 has a first aircraft attachment point 215 where it is attached to the aircraft 101. Whilst the first aircraft attachment point 215 provides a single localised coupling to the aircraft structure configured to withstand loads between landing gear and aircraft, it will be understood that the attachment at this point may be provided by multiple parts such as forward and aft pintles (not shown) or other any suitable fitting such that the main strut 210 is arranged to pivot about the first aircraft attachment point 215 (i.e. in the same plane as the aspect of the drawing of FIG. 2).

A sidestay 220 of the landing gear assembly 200 has a first end coupled to the main strut 210 at a sidestay attachment point 225 (which is distant from the first aircraft attachment point 215). The sidestay attachment point 225 may be any suitable joint or coupling which holds the sidestay 220 in position with respect to the main strut 210 while allowing angular movement of the sidestay 220 between an unfolded position (as shown in FIG. 1) and a substantially folded or closed position to be further described below.

A second end of the sidestay 220 is coupled to a second aircraft attachment point 230 of the aircraft 101. The sidestay 220 is arranged to move between a substantially open or unfolded position (as shown in FIG. 2) and a substantially closed or folded position to be further described below. The second aircraft attachment point 230 may be a cardan joint, or any suitable joint which holds the sidestay 220 in place when in the unfolded or folded positions and also allows movement of the sidestay 220 between these two positions. When the landing gear assembly 200 is in the deployed (extended) position as shown in FIG. 2, the main strut 210 is held in the extended position by the sidestay 220. The sidestay 220 has two arms connected via an articulated joint 240, which allows the two sidestay arms to fold together. The articulated joint 240 may be a hinged joint with one degree of freedom, or it may be a spherical joint arranged to provide two or more degrees of freedom. The two arms may be of different lengths or the same length. The sidestay 220 has an over-centre locking arrangement (as can be seen by the non-linear configuration of the two arms in FIG. 2) such that when in the unfolded position, compression forces acting between the first and second ends of the sidestay 220 hold it in the unfolded position, and it cannot be moved to the closed or folded position without an actuation force being applied to counteract the compression forces described above. In this way the sidestay 220 remains in the unfolded position until an actuation force is applied as will be further described below.

A telescopic locking actuator 250 has a first end connected to the articulated joint 240 of the sidestay 220 and a second end connected to an arm 255 of the main strut 210, via a pivot joint at the end of the arm 255. The geometry of the arm 225 and the position of the pivot joint at the end of the arm 255 means that it is phased with respect to the rotational movement of the main strut 210. In this way as the main strut 210 is retracted, the pivot joint at the end of the arm 255 describes an arc concentric to the first aircraft attachment point 215 but offset from the longitudinal axis of the main strut 210 (i.e. a phased angular relationship is defined geometrically between the arm 255, the pivot axis defined by the first aircraft attachment point 215, and the longitudinal axis of the main strut 210). This angular phasing of the arm 255 will be further described below.

It will be appreciated that the second end of the telescopic locking actuator 250 could alternatively be attached to one or other of the arms of the sidestay 220 either side of the articulated joint 240. The telescopic locking actuator 250 is mounted in a telescopic strut, and in FIG. 2 it is shown in a first, extended position with a first defined length 260 between the articulated joint 240 and the arm 255 of the main strut 210. The telescopic locking actuator 250 has at least one input line (not shown) which is coupled to a control system (not shown) of the aircraft 101, such that the control system provides a means to actuate the telescopic locking actuator 250. In one embodiment, the control system, input line and telescopic locking actuator 250 are all hydraulic, and the control system is part of a larger hydraulic system of the aircraft 101.

The telescopic locking actuator 250 has a self-locking feature to ensure that unless differently actuated, it maintains the first defined length 260 which in turn ensures that the articulated joint 240 is held in the over-centre locking position as depicted in FIG. 2. Therefore after extension of the landing gear assembly 200, a failure of the hydraulic system of the aircraft will not unlock the telescopic locking actuator 250, and the landing gear assembly 200 will remain in a down-lock (i.e. extended) condition.

Each of the connections between the main strut 210, the sidestay 220 and the telescopic locking actuator 250 (the sidestay attachment point 225, the articulated joint 240 and the connection between the sidestay 220 and the arm 255) are adjustable in such a way that the relative positions between these elements, and their motion paths (kinematics) may be adjusted. This will be further described below.

Figure 3:
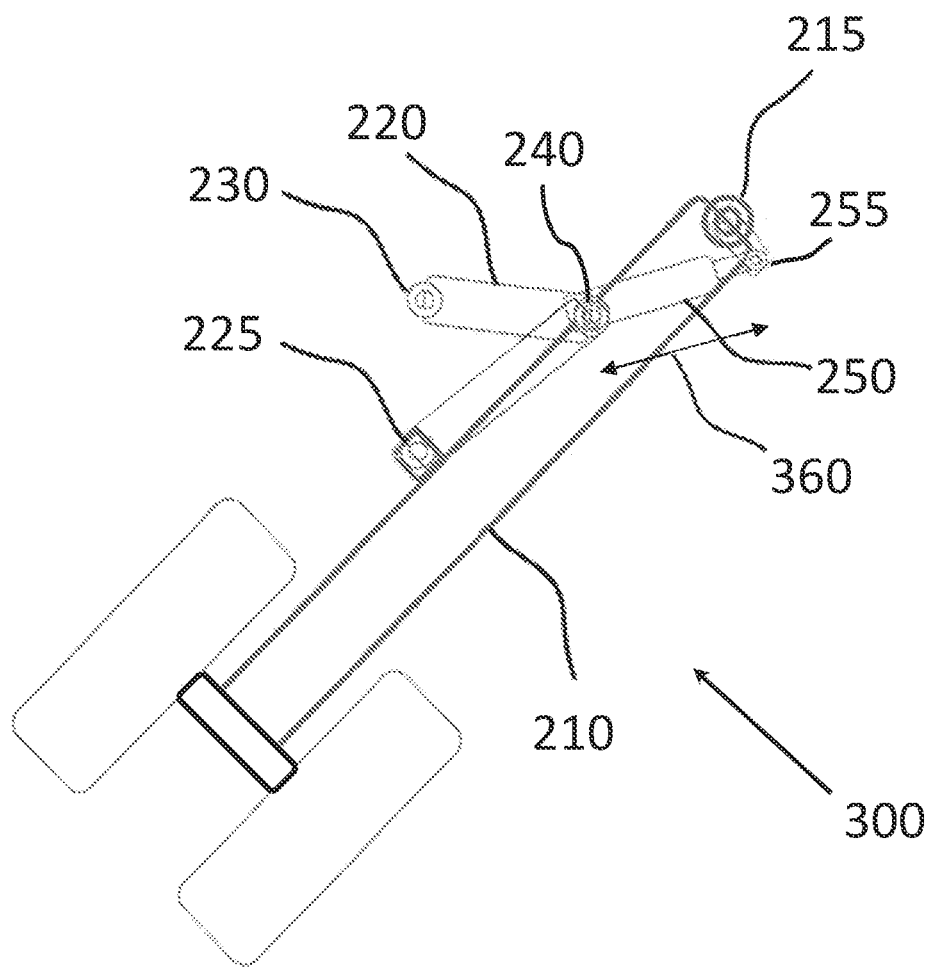
FIG. 3 shows an aircraft landing gear assembly of FIG. 2 in a second position.

Referring now also to FIG. 3, the landing gear assembly 200 of FIG. 2 is shown in a partially retracted configuration, now labelled as landing gear assembly 300. The telescopic locking actuator 250 has been actuated by the control system (not shown) to retract the landing gear assembly 300, and at the partially retracted point depicted in FIG. 3 the telescopic locking actuator 250 now has a second defined length 360 between the articulated joint 240 and the arm 255 of the main strut 210, the second defined length 360 being shorter than the first defined length 260 of FIG. 2. As mentioned above the over-centre locking position of the sidestay 220 means that it can only fold towards the main strut 210. By virtue of the actuation of the telescopic locking actuator 250 from the first defined length 260 to the second defined length 360, the articulated joint 240 of sidestay 220 is pulled away from the over-centre locking position towards the main strut 210, and the two arms of the sidestay are drawn towards each other. Consequently the main strut 210 is drawn up in an clockwise rotational movement about the first aircraft attachment point 215.

The telescopic locking actuator 250 is adjustable such that the first and second defined lengths 260 and 360 respectively may be adjusted, to be further described below.

Figure 4:
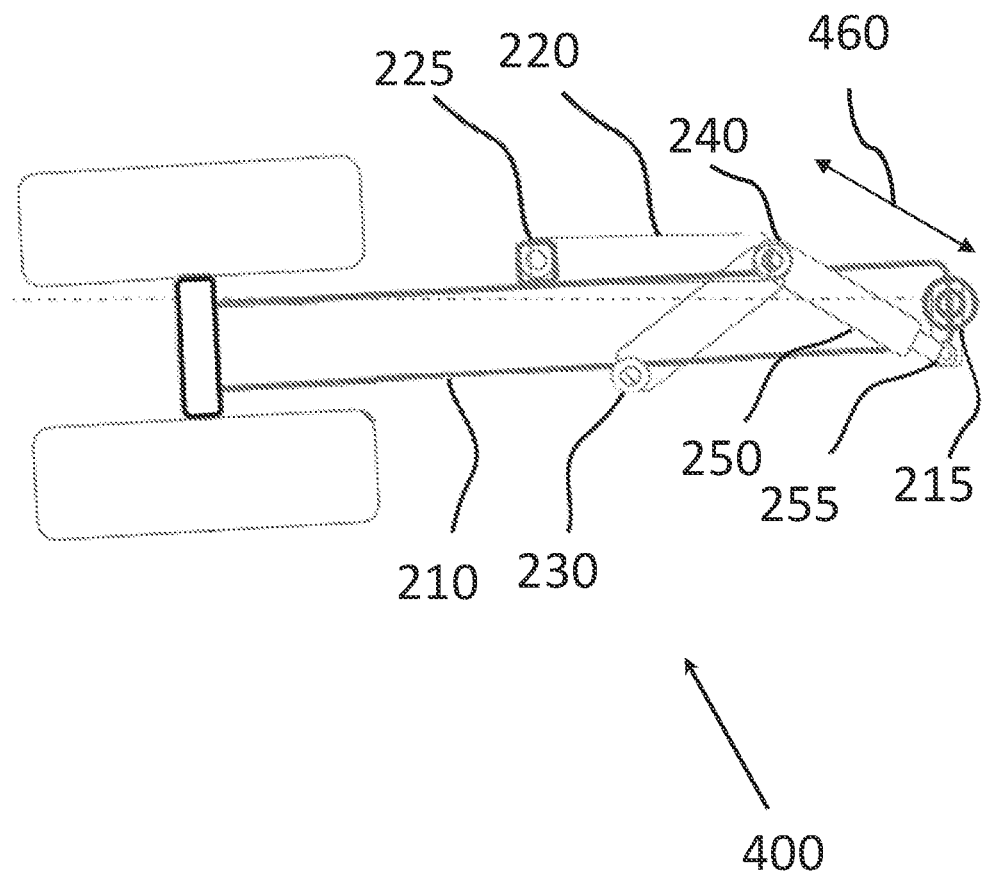
FIG. 4 shows an aircraft landing gear assembly of FIG. 2 in a third position.

Referring now also to FIG. 4, the landing gear assembly 200 of FIG. 2 is shown in a substantially retracted configuration, labelled now as landing gear assembly 400. The telescopic locking actuator 250 of FIG. 2 has now contracted further to a third defined length 460 between the articulated joint 240 and the arm 255 of the main strut 210, the third defined length 460 being shorter than the second defined length 360 of FIG. 3. As a result the articulated joint 240 of the sidestay 220 is pulled further towards the first aircraft attachment point 215; the geometry of the arm 255 and the relative lengths of the arms of the sidestay 220 are such that main strut 210 is drawn up beyond the location of the second aircraft attachment point 230, such that the arms of the sidestay 220 have crossed over. The main strut 210 may now be locked in its retracted position by suitable means such as an uplock (not shown).

The geometry of the arm 255 and the lengths of the two arms of the sidestay 220, plus the relative positions of the first and the second aircraft attachment points 215 and 230 respectively are carefully determined in order to achieve the desired motion paths and forces during extension (deployment) and retraction of the landing gear assembly 200.

The phasing of the arm 255 with respect to the longitudinal axis of the main strut 210 is such that near the fully retracted position the moment arm of the telescopic locking actuator 250 with respect to the main strut 210 increases towards a maximum value. This is in order to compensate for the reduction in the moment arm of the sidestay 220 acting upon the main strut 210 as the two arms of the sidestay 220 are drawn together, and also to counteract the increasing moment arm of the main strut 210 around the axis of the first aircraft attachment point 215, which is also approaching its maximum near the fully retracted position.

It will be further appreciated that with the above arrangement, a sub-assembly comprising the main strut 210, sidestay 220 and telescopic locking actuator 250 may be assembled away from the aircraft 101 at, for example, a landing gear assembly line. Since the relative positions and critical kinematics (motion paths) for the landing gear assembly 200 all relate to the elements of the sub-assembly described above, it will be readily apparent that once these elements, namely the main strut 210, sidestay 220 and telescopic locking actuator 250 have been assembled together and their relative positions and kinematics suitably adjusted, negligible further adjustment will be necessary in order to fit the sub-assembly 200 on to the aircraft 101.

Figure 5:
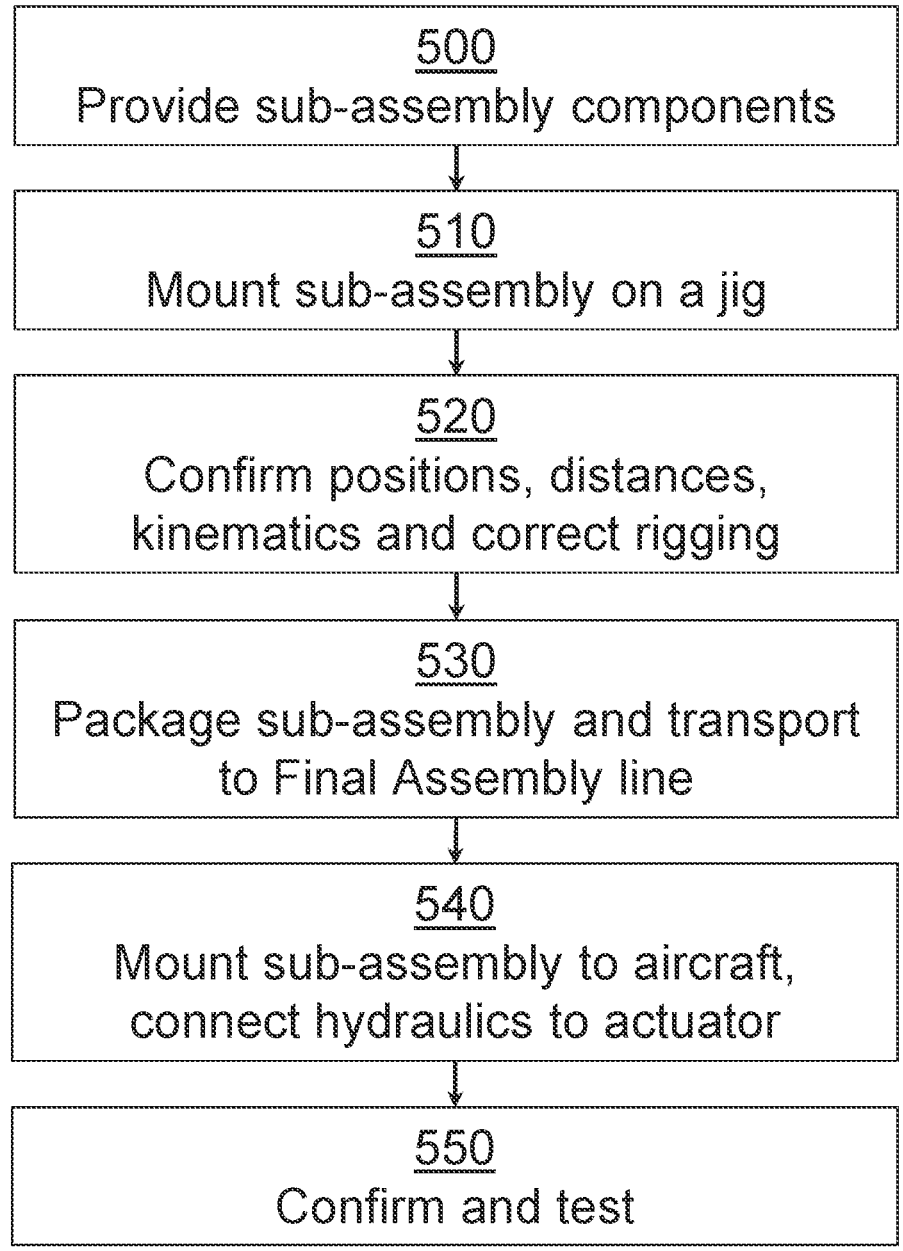
FIG. 5 is a flow diagram illustrating a method of mounting an aircraft landing gear assembly on an aircraft, in accordance with a further embodiment of the invention.

Referring now also to FIG. 5, a method is described for mounting a retractable landing gear assembly according to the invention on to the aircraft 101. At step 500, sub-assembly components comprising the main strut 210, the sidestay 220 and the telescopic locking actuator 250 are provided at a landing gear assembly line or maintenance facility, which may be distant from, or at the same facility as, a final assembly line for assembly of the aircraft 101. Other sub-assembly components of the landing gear assembly may also be provided, such as wheels, axles, shock-absorbers and torque links.

At step 510 the sub-assembly components are fitted together. The sub-assembly components may be first assembled and then mounted on a jig, or they may be assembled using the jig. The jig is arranged to have attachment points which mirror the first and second aircraft attachment points 215 and 230 respectively of the aircraft 101, and these attachment points may be adjustable. The jig may also be arranged to mirror other dimensional aspects of the aircraft 101, such as wheel-well dimensions and other aircraft components. This ensures that clearances, other critical distances and motion paths required of the landing gear sub-assembly may be adjusted and verified while it is attached to the jig.

At step 520, while on the jig, required positions, distances and other parameters relating to the main strut 210, the sidestay 220 and the telescopic locking actuator 250 of the landing gear sub-assembly are measured and adjusted.

A number of such parameters may be specified. For example a certain distance may be specified between the first aircraft attachment point 215 and the second aircraft attachment point 230 in order for the landing gear sub-assembly to correctly configured for fitting to the aircraft 101.

In particular the position and orientation of the attachment points of the landing gear sub-assembly are adjusted at the jig in order that they are suitable for fitting the landing gear sub-assembly to the aircraft 101.

In the same way, while on the jig, the sub-assembly is extended and retracted several times in order to confirm and if necessary make adjustments to the kinematics (motion paths) of the landing gear sub-assembly as it transitions between a retracted configuration and an extended (deployed) configuration.

In this way the correct motion paths of the sub-assembly are established and any tolerances, clearances or other parameters related to kinematics are confirmed while the sub-assembly is coupled to the jig, such that the sub-assembly is 'pre-rigged' prior to attaching it to the aircraft 101.

The above adjustments are made whilst the landing gear assembly 200 is on the jig by adjusting the connections between the main strut 210, the sidestay 220 and the telescopic locking actuator 250 (the sidestay attachment point 225, the articulated joint 240 and the connection between the sidestay 220 and the arm 255) and by adjusting the defined lengths (such as the first, second and third defined lengths 260, 360 and 460 respectively of the telescopic locking actuator 250).

It may be that specific parameters of the aircraft to which the sub-assembly is to be attached are taken into account during this step (for example to take into account manufacturing tolerances and/or variations in dimensions that are specific to the airframe in question).

At step 530 the sub-assembly is removed from the jig but the attachments between the main strut 210, sidestay 220 and telescopic locking actuator 250 (the sidestay attachment point 225, the articulated joint 240 and the connection between the sidestay 220 and the arm 255) and any adjustments made to the defined lengths of the telescopic locking actuator 250 are not disturbed. The sub-assembly is packaged (if necessary) and transported to a final assembly line or maintenance facility in a substantially pre-rigged condition.

At step 540 the sub-assembly is mounted to the aircraft 101 via the first and second aircraft attachment points 215 and 230 respectively. If not already present, other components of the landing gear assembly such as wheels may be added to the sub-assembly at this point. Hydraulic lines and other control lines (not shown in the figures) are then connected, and at step 550 confirmation and final testing of the retraction and extension of the sub-assembly is performed when attached to the aircraft 101.

Since the sub-assembly is 'pre-rigged' at the jig and no separate installation of a retraction actuator, lockstay actuator or other components are required at the aircraft 101. Therefore a substantially faster and simpler installation may be achieved at the final assembly line or maintenance facility, since fewer rigging and adjustment steps are required.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

It will be appreciated that the main strut 210 of landing gear assembly 200 may be attached to the airframe by fixings other than the pintle arrangements described above. Similarly the top of the sidestay 220 may be attached to the aircraft 101 by a fixing other than the cardan joint described above. In both cases the significance of these fixings are that there is no need to check actuator gaps, retraction paths or other kinematics at the final assembly line or maintenance facility.

Furthermore in this way the retractable landing gear assembly becomes a "plug and play" installation, making it quicker and easier than current arrangements. It will also be readily apparent that the kinematics of the telescopic locking actuator 250 could be defined in other favourable directions and force orientations to that described above, together with different phasing of the arm 255 relative to the retraction angle of the main strut 210 and the folding (and relative lengths of) the arms of the sidestay 220.

The telescopic actuator 250 described above in relation to hydraulic actuation could be replaced with an electric motor actuator or other technical means to actuate the transition of the landing gear assembly 200.

Furthermore the telescopic locking actuator 250 could be arranged to push instead of pull to retract, in which case the automatic locked position would be when the telescopic locking actuator 250 is in a contracted position.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A retractable landing gear assembly for an aircraft, the retractable landing gear assembly comprising:
    a main strut having a main arm extending outwardly at one end of the main strut in a first direction, the main strut is configured to be coupled to a first attachment point of an aircraft and further arranged to pivot about the first attachment point between a retracted position and an extended position;
    a sidestay having a first arm and a second arm coupled to the first via an articulated joint, wherein one end of the first arm is coupled to the main strut at an attachment point extending outwardly from the main strut in a second direction opposite the first direction, and wherein one end of the second arm is coupled to a second attachment point of the aircraft, the sidestay having an unfolded position and a folded position; and
    an actuator coupled to the main arm of the main strut at one end via a pivot joint at an end of the main arm, and to the articulated joint of the sidestay at a second opposing end, the actuator being arranged to define a first actuation length and a second actuation length; wherein
    when the actuator has the first actuation length the sidestay is in the unfolded position and the main strut is locked in the extended position, and when the actuator has the second actuation length the sidestay is in the folded position and the main strut is in the retracted position;
    wherein the first actuation length is longer than the second actuation length; and
    wherein the actuator is further arranged to lock the sidestay in the unfolded position.

2. The retractable landing gear assembly of claim 1, wherein the actuator is arranged to maintain the first actuation length unless differently actuated.

3. The retractable landing gear assembly of claim 1, wherein the actuator is a hydraulic actuator mounted in a telescopic strut.

4. The retractable landing gear assembly of claim 1, wherein the sidestay has an over-centre locking arrangement, such that when in the unfolded position compression forces acting between the ends of the sidestay hold it in the unfolded position.

5. An aircraft having at least one retractable landing gear assembly according to claim 1.

6. A method of manufacturing the retractable landing gear assembly of claim 1 for attachment to an aircraft, the method including:
    coupling an actuator between first and second elements of the retractable landing gear assembly, the actuator being so arranged to retract the retractable landing gear assembly when in use on an aircraft;

with the actuator so coupled, retracting and extending the retractable landing gear assembly; and adjusting parameters and/or connections of the retractable landing gear assembly prior to attaching it to the aircraft.

7. A method of attaching a retractable landing gear assembly to an aircraft, the method comprising the steps of:

attaching a first element of the retractable landing gear assembly to a first attachment point of the aircraft; and attaching a second element of the retractable landing gear assembly to a second attachment point of the aircraft;

wherein the retractable landing gear assembly includes an actuator coupled between the first and second elements respectively, the actuator being arranged to retract and/or extend the retractable landing gear assembly when in use on an aircraft;

wherein the first and second elements of the retractable landing gear assembly comprise a main strut and a sidestay respectively;

wherein the actuator is further arranged to lock the sidestay in the unfolded position;

wherein the locked length of the actuator is longer than an extended length of the actuator in an extended position of the sidestay;

wherein the actuator is coupled to a main arm of the first element at one end via a pivot joint at an end of the main arm;

wherein the main arm extends outwardly in a first direction; and, wherein the sidestay is coupled to the main strut at an attachment point extending outwardly from the main strut in a second direction opposite the first direction.

8. The method of claim 7, wherein the method includes, prior to the step of attaching the first element of the retractable landing gear assembly to a first attachment point of the aircraft, retracting and extending the retractable landing gear assembly on a jig and performing adjustments to parameters and/or connections of the retractable aircraft landing gear assembly.

9. The method of claim 7, wherein the sidestay includes two arms coupled via an articulated joint, and wherein the actuator is coupled to the articulated joint.

10. The method of claim 6, wherein the actuator is a hydraulic actuator mounted in a telescopic strut.

11. The method of claim 7, wherein the actuator is a hydraulic actuator mounted in a telescopic strut.

12. The method of claim 7, wherein the sidestay has an over-centre locking arrangement, such that when in the unfolded position compression forces acting between the ends of the sidestay hold it in the unfolded position.

* * * * *